No. 746,154. PATENTED DEC. 8, 1903.
T. M. RAMSAY.
ADJUSTABLE DRIVER'S SEAT.
APPLICATION FILED APR. 22, 1903.
NO MODEL. 2 SHEETS—SHEET 1.

Witnesses
J. Edmunds.
A. Byrick

Inventor
Thomas M. Ramsay
By P. J. Edmunds
Attorney

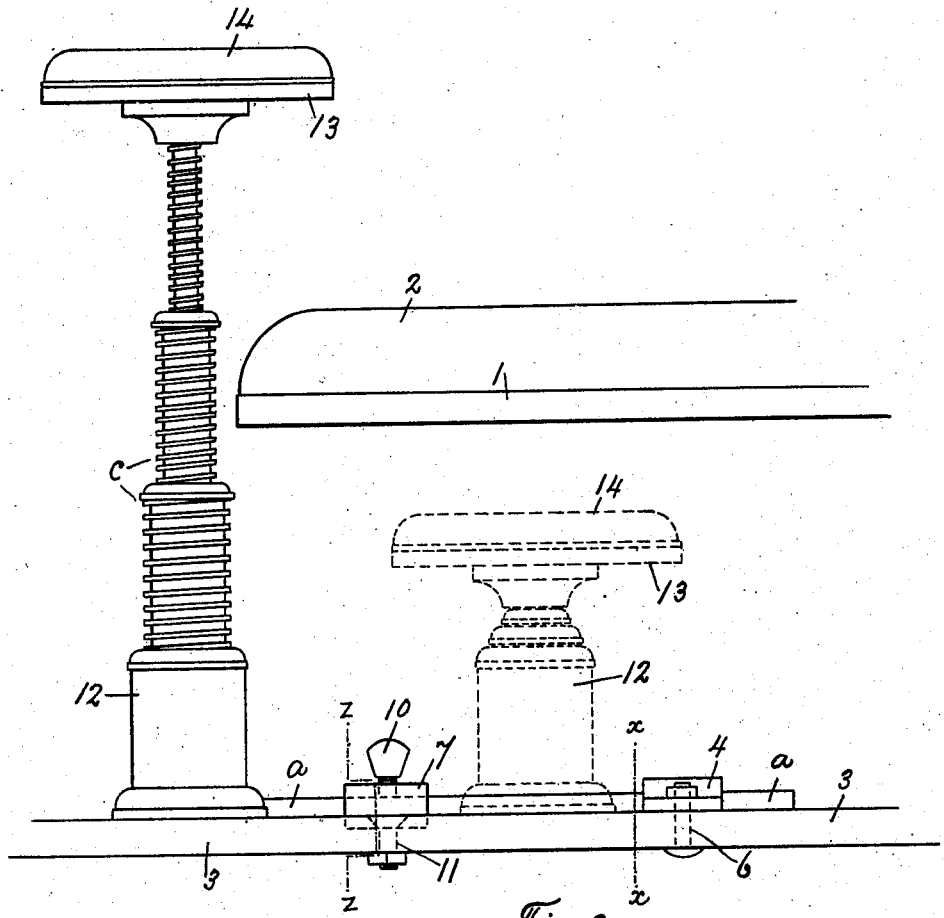

No. 746,154.

Patented December 8, 1903

UNITED STATES PATENT OFFICE.

THOMAS M. RAMSAY, OF THORNDALE, CANADA.

ADJUSTABLE DRIVER'S SEAT.

SPECIFICATION forming part of Letters Patent No. 746,154, dated December 8, 1903.

Application filed April 22, 1903. Serial No. 153,811. (No model.)

*To all whom it may concern:*

Be it known that I, THOMAS M. RAMSAY, a subject of the King of Great Britain, and a resident of Thorndale, in the county of Middlesex, in the Province of Ontario, Canada, have invented certain new and useful Improvements in Adjustable or Removable Drivers' Seats, of which the following is a specification.

This invention relates to the providing of seating accommodation for the driver of a buggy, carriage, or other similar class of vehicle when the ordinary seats are all occupied, the object being to provide a seat which may be adjusted out of the way or removed altogether, at the same time when in use will provide a simple, strong, durable, inexpensive, and comfortable seating accommodation for the driver; and it consists of the improved construction and novel combination of parts of the same, as will be hereinafter first fully set forth and described, and then pointed out in the claims.

Figure 1:
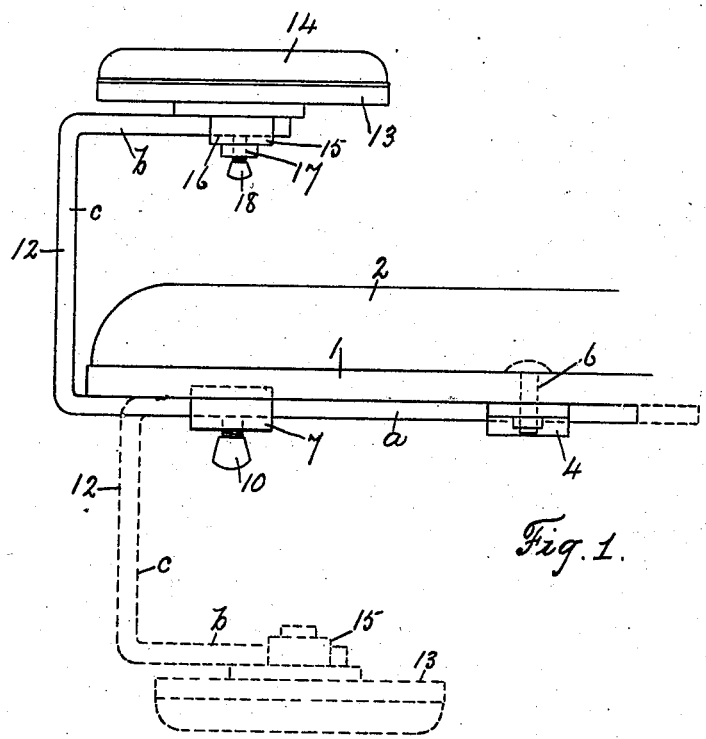
Figure 3:
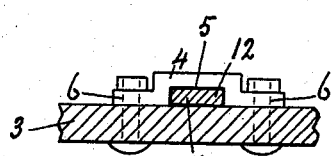
Figure 4:
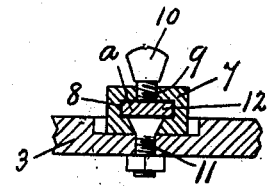

Reference being had to the accompanying drawings, Figure 1 is a side elevation of an adjustable or removable driver's seat embodying my invention. In this view it is shown secured to the ordinary seat of the buggy or vehicle. Fig. 2 illustrates a modification in the construction of my invention, and in this view it is shown secured to the bottom of the buggy or vehicle. Fig. 3 is a cross-sectional view on the line $x$ $x$ of Fig. 2. Fig. 4 is a cross-sectional view on the line $z$ $z$ of Fig. 2.

In the accompanying drawings the numeral 1 designates the ordinary seat, 2 the cushion placed thereon, and 3 the bottom of the carriage or vehicle.

4 designates a bar or clasp in which the socket 5 is formed, and said bar is bolted by the bolts 6 or otherwise rigidly secured to the under side of the seat 1, as shown in Fig. 1, or to the bottom 3, as shown in Fig. 2.

7 designates a pivot-block in which the socket 8 and screw-threaded socket 9 are formed.

10 designates a thumb-screw which engages with the screw-threaded socket 9 in the pivot-block 7.

11 designates a pivot-bolt rigidly secured to the seat 1, as shown in Fig. 1, or to the bottom 3, as shown in Fig. 2, on which bolt said block 7 is pivotally mounted.

12 designates a bracket, the arm $a$ of which is fitted to and inserted in and is adapted to be adjusted back and forth perfectly free in the sockets 8 and 5 of the pivot-block 7 and the clasp 4, respectively, and when properly adjusted said bracket 12 is rigidly held and locked in place by tightening said thumb-screw 10.

13 designates a driver's seat provided with a cushion 14, and to the under side of said seat a block 15 is rigidly secured, in which block 15 the socket 16 and screw-threaded socket 17 is formed.

18 designates a thumb-screw, which is inserted in and engages with the screw-threaded socket 17 in the block 15.

$b$ designates another arm of the bracket 12, which is fitted to and inserted in the socket 16 in the block 15, and when said seat 13 is adjusted to the required position on said arm $b$ it is rigidly held and locked at that point by tightening the thumb-screw 18.

$c$ is the vertical portion of the bracket 12.

In the modification of this device shown in Fig. 2 the vertical member $c$ of the bracket is shown in the form of a telescopic screw consisting of several concentric cylindrical sections which may be turned one into or out of the other. This adapts this device to be secured to the bottom 3 of the carriage or vehicle.

This device is secured in place either to the ordinary seat 1 or bottom 3 of the carriage or vehicle in connection with which it is intended to be used by securing the bar 4 to and near the rear of and the pivot-block 7 to and near to the front of the seat 1, as shown in Fig. 1, and in line with one another, so that the pivot-block 7 may be adjusted to bring the socket 8 in line with the socket 5 of the bar 4. When said supporting-block 7 and bar 4 are so secured and adjusted, the arm $a$ of the bracket 12 is inserted and adjusted in said sockets in said block and bar until the seat 13 is at the desired position, when said arm $a$, as well as said seat 13, secured thereto, is rigidly held and locked in said position by tightening the thumb-screw 10. If, however, the bracket 12 was adjusted against the seat 1 and the seat 13 did not extend far enough back over the ordinary seat 1, the thumb-screw 18 could be loosened and the seat 13 adjusted on the arm $b$ to extend farther over on the ordinary seat 1. Again, if the supplemental driver's seat 13 should not be required, by loosening the set-screw 10 said seat 13 and bracket 12 could be withdrawn from the sockets 5 and 8 and clear of the bar 4 and pivot-block 7, when said seat could be inverted, as shown by dotted lines in Fig. 1, and inserted in the socket 8 in the pivot-block only, when the latter, as well as the seat 13 and bracket 12, could be adjusted at an angle to the position shown by solid lines in Fig. 1 or to the position shown by dotted lines in Fig. 1 and under the seat and completely out of the way of the occupants of the vehicle or removed altogether, as preferred.

In Fig. 2 the socketed pivot-block 7 and bar 4 are shown secured to the bottom 3 of the vehicle; but when the arm $a$ of the bracket 12 is inserted in said socketed block and bar when so placed the vertical portion $c$ of said bracket must be adapted to be lengthened to bring the seat 13 high enough to accommodate the driver comfortably, as shown by solid lines in Fig. 2, and, again, said portion $c$ must be adapted to be shortened, so that when the set-screw 10 is loosened it may be withdrawn from the socket 5 and adjusted at an angle to the view shown by solid lines in Fig. 2 and out of the way of the occupants of the vehicle and under the seat, as shown by dotted lines in Fig. 2. As a result a simple, strong, and durable seat is provided, one which may be adjusted to adapt it to be comfortable for the driver and at the same time not interfere or come in contact with the occupants of the ordinary seat and one which when not in use may be adjusted out of the way under the seat, so as not to interfere with the occupants of the vehicle, or be altogether removed, as preferred.

I have found by experiment that the construction herein shown and described gives the best results. At the same time while I prefer said construction I do not wish to limit myself to the details thereof, as they may be modified in various ways without departing from the spirit of my invention.

Having thus described my invention, I claim—

1. In a device of the class described, a supporting block and bar in each of which a socket is formed, said block being pivotally secured to, and said bar being rigidly secured to the ordinary seat or body of a vehicle, in combination with a bracket, one arm of which is inserted in said sockets in said supporting block and bar, a supplemental or driver's seat secured to said bracket, and means for holding said bracket at the position to which it is adjusted in said socketed supporting block and bar, substantially as and for the purpose set forth.

2. In a device of the class described, a supporting block and bar in each of which a socket is formed, said block being pivotally secured to, and said bar being rigidly secured to the ordinary seat or body of a vehicle, in combination with a supplemental or driver's seat a block rigidly secured thereto in which a socket is formed, a bracket, one arm, $b$, of which is inserted in said socket, and having another arm, $a$, which is inserted in said socketed supporting block and bar, and means for holding said driver's seat and seat-block at the position to which they are adjusted on said bracket, and for holding the arm, $a$, of the latter at the position to which it is adjusted in the supporting socketed pivot block and bar, substantially as and for the purpose set forth.

In testimony whereof I have signed in the presence of the two undersigned witnesses.

THOMAS M. RAMSAY.

Witnesses:
P. J. EDMUNDS,
A. BYRICK.